(12) United States Patent
Alexander

(10) Patent No.: US 9,336,378 B2
(45) Date of Patent: May 10, 2016

(54) CREDENTIAL SHARING

(71) Applicant: Google Inc., Mountain View, CA (US)

(72) Inventor: Eldridge Lee Alexander, Ann Arbor, MI (US)

(73) Assignee: GOOGLE INC., Mountain View, CA (US)

( * ) Notice: Subject to any disclaimer, the term of this patent is extended or adjusted under 35 U.S.C. 154(b) by 36 days.

(21) Appl. No.: 14/231,308

(22) Filed: Mar. 31, 2014

(65) Prior Publication Data

US 2015/0278510 A1 Oct. 1, 2015

(51) Int. Cl.
*G06F 21/45* (2013.01)
*H04L 29/06* (2006.01)
*H04W 12/06* (2009.01)
*H04W 84/12* (2009.01)

(52) U.S. Cl.
CPC .............. *G06F 21/45* (2013.01); *H04L 63/083* (2013.01); *H04L 63/104* (2013.01); *H04W 12/06* (2013.01); *H04W 84/12* (2013.01); *G06F 2221/2145* (2013.01)

(58) Field of Classification Search
CPC . G06F 21/45; G06F 2221/2145; H04L 29/06; H04L 63/083; H04L 63/104; H04W 12/06; H04W 84/12
USPC .............................................................. 726/6
See application file for complete search history.

(56) References Cited

U.S. PATENT DOCUMENTS

| 8,254,915 | B2 | 8/2012 | Kozisek |
| 8,619,674 | B1 | 12/2013 | Shipley et al. |
| 2008/0132235 | A1 | 6/2008 | Hancock et al. |
| 2013/0115915 | A1 | 5/2013 | Tipton et al. |
| 2013/0166910 | A1 | 6/2013 | Wilkinson et al. |

FOREIGN PATENT DOCUMENTS

| EP | 1710725 A2 | 10/2006 |
| WO | 2013160526 A1 | 10/2013 |

OTHER PUBLICATIONS

International Search Report and Written Opinion dated Jun. 10, 2015 in International Application No. PCT/US2015/023511.

*Primary Examiner* — Kambiz Zand
*Assistant Examiner* — Benjamin Kaplan
(74) *Attorney, Agent, or Firm* — Morris & Kamlay LLP

(57) ABSTRACT

A credential can be shared by one user with other users when sharing conditions are met. Sharing conditions can include a time, time range, date, date range and the geographic location of a user with whom the credential is to be shared. The credential can be shared so that it is not visible or accessible in plaintext to the shared-with user. Sharing conditions can include conditions that, when met, result in the revocation of a shared credential.

20 Claims, 6 Drawing Sheets

CREDENTIAL SHARING

BACKGROUND

A credential such as a password for a given user device and a given WiFi network gateway can be stored in the cloud and be associated with a user account. When the user activates a new device and logs into the user account, a cloud-based service can provide the password to the device, which in turn can provide the credential to the WiFi gateway. Thus, the user need not manually reenter his WiFi password upon activating a new device. The password may not be accessible in plaintext by the user via the device. This can enhance the security of the password storing and providing system.

BRIEF SUMMARY

According to implementations of the disclosed subject matter, a password and a network access identifier (such as a Media Access Control (MAC) address or a Service Set Identifier (SSID)) can be received. The password can be a user's credential to obtain access to a network through a network access device having corresponding to the network access identifier. A signal can be received that indicates at least one condition under which the password is to be shared with another user. In response to receiving the signal, it can be determined that one or more other users ("shared-with users") meet the conditions and are authorized to have access to the password. Based upon this determination, the password can be shared with the one or more authorized other users.

In an implementation, the password and network identifier may be received as part of a synchronization ("syncing") operation between a device (such as a mobile device) of the sharing user and a server. The syncing operation can include a data backup operation where data on the mobile device is backed up to a user account on the server. The password and network identifier may be stored at the server in conjunction with the sharing user account.

The signal indicating at least one condition under which the password is to be shared can include one or more identifiers corresponding to another user with whom the password is to be shared, a type of other user with whom the password is to be shared and an identifier of a group of other users with whom the password is to be shared. For example, the signal can include one or more usernames, one or more user properties or one or more named groups on social networks.

The signal can also include a time, a date, a time range and a date range. The password can be shared with other users at the time and date, within a temporal threshold around the time and date or within the time and date range. A password shared with user that no longer meets any temporal criteria specified in the signal can be revoked. In another implementation, the temporal criteria can relate to granting criteria and once granted, the shared-with user can keep the password even outside the temporal granting criteria.

The signal can also include a geographic location or a geographic area. The password can be shared with other users who are at a geographic location, within a geographical threshold around the geographic location (e.g., with ten meters, a mile, ten miles, etc.) or within a geographic area. The geographic area can be specified as a place name (e.g., the District of Columbia) or a set of coordinates circumscribing an area, etc. A password shared with user that no longer meets any geographical criteria specified in the signal can be revoked. For example, a user with whom the password was shared when the user was within the boundaries of the District of Columbia can be revoked when the user leaves the District of Columbia In another implementation, the geographical criteria can relate to granting criteria and once granted, the shared-with user can keep the password even outside the geographical granting criteria. For example, the user need be within the District of Columbia to receive the password, which need not be revoked simply because the shared-with user leaves the District of Columbia.

The signal can also specify at least one condition under which a shared password is to be revoked. For example, the signal can indicate that the password be revoked when other criteria are no longer met, as described above. The signal can specify that the password be revoked based on a command received from the sharing user, based upon a password reset by the sharing user or by a third party, based upon detected activity by the shared-with user, such as downloading more than a download threshold of data through the connection made accessible by the password, etc.

A shared password may not be visible to the shared-with user. This can prevent a shared-with user from further sharing the password with another. An implementation of the disclosed subject matter can be used for other shared data besides passwords. For example, the shared data can be any kind of credential that is needed to gain access to, permission or authorization for any application, including access to a network through a gateway, access to a website or online service, access to a live event (e.g., a ticket), etc.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
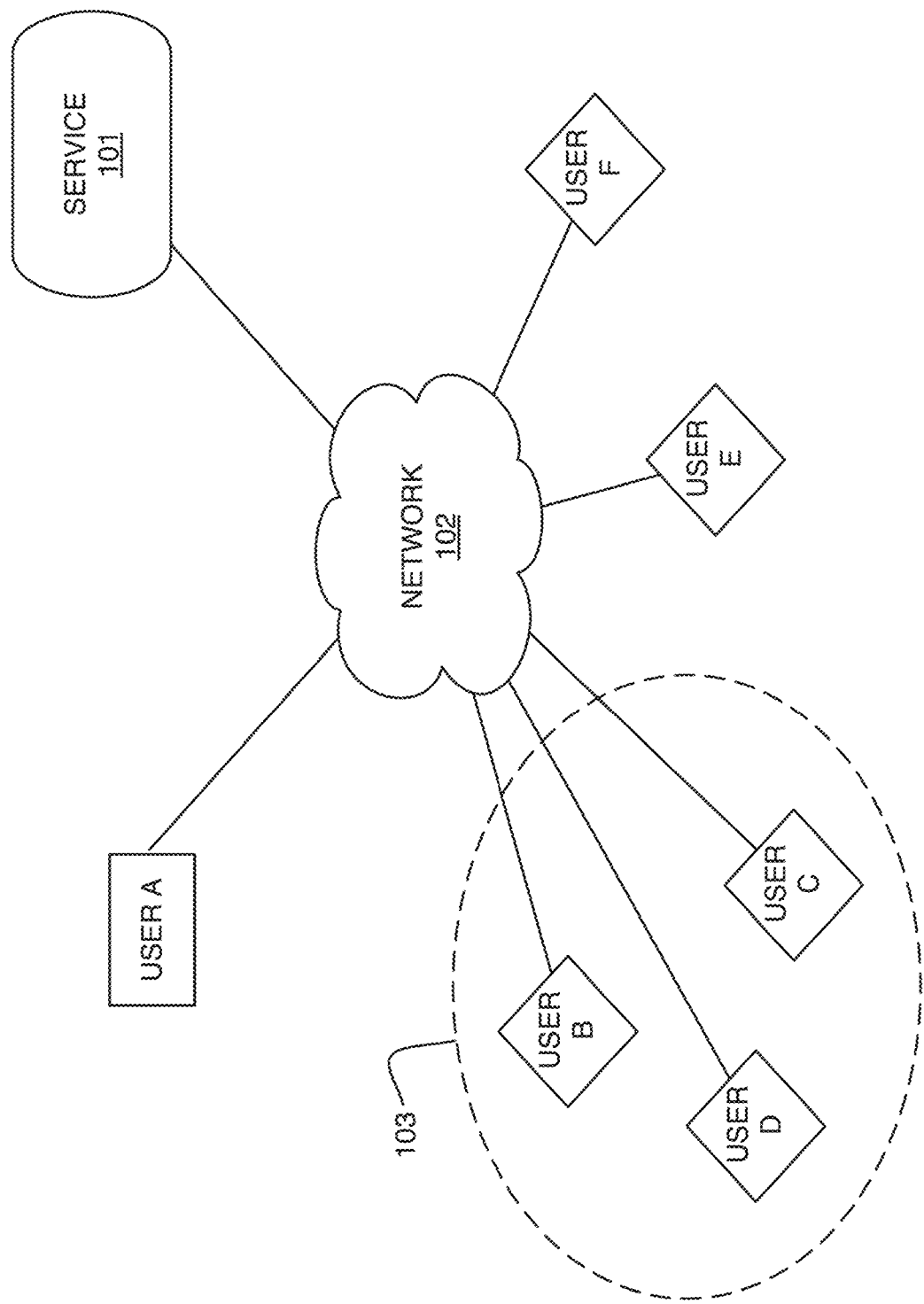
FIG. 1 shows a system according to an implementation of the disclosed subject matter.

An implementation in accordance with the disclosed subject matter can enable a user to control the conditions under which a credential can be shared with others. For example, a user may store a Wi-Fi access credential on a device such as a mobile device, a personal computer, a fob, etc. An example of such a Wi-Fi credential can include a password for gaining access to the Internet at the user's home through the user's cable modem. The credential can also include or be associated with an identifier of a gateway or router. For example, the user's home Wi-Fi password may be associated with the MAC address and/or an alias for the user's cable modem.

A user's credentials can be stored on one or more of the user's mobile devices. The credentials can be automatically synchronized ("synced") or backed up (periodically or manually) to a server that can be cloud-based, where they can be associated with an account of the user. If the user loses the data on his mobile device or purchases a new mobile device, the user can logon to his account through the device and the credentials can be automatically restored to the device. In an implementation, the restored credential may not be visible or made available to the user in plaintext. This can be done by using the same or a similar mechanism by which prevents credentials that are restored to a device from a prior backup from being visible to the user on the restored device, although the credentials are still functional. In other words, the restored credentials are stored on the device and can be used to logon, but they are not visible or accessible in plaintext to the device user. This feature can be implemented using the operating system of the restored device and/or an application operating on the restored device. In an implementation of the disclosed subject matter, the device can automatically use the restored credential to automatically logon to the appropriate Wi-Fi network when the device comes into proximity with the network.

In particular, an implementation of the disclosed subject matter can receive a credential such as a Wi-Fi password and a network access identifier. The network access identifier can be a network address, a host name, a Media Access Control (MAC) address, a Service Set Identifier (SSID), etc., e.g., for a network access device. A network access device may be a device such as a router, a cable modem or a gateway. The Wi-Fi password and the network access identifier can be associated with a user identifier, such as a userid of an account, a mobile device identifier such as a UDID, IMEI, MEID, ESN or MAC identifier or a special purpose user identifier. The credential can be received by a server that syncs with a device (such as a smartphone) of the user, such as for the purpose of backing up at least some of the data on the user's device. This can be done automatically or be initiated by the user.

In an implementation, the user can specify the conditions under which a credential can be shared with others. This may be done through the user interface on the user's mobile device, through a computer distinct from the user's device, etc. Conditions can include an identity of another user or group of users with whom the credential may be shared, a blacklist of users or groups with whom the credential may not be shared, one or more dates or date ranges on which the credential may be shared, times of day during which the credential may be shared, permissible and/or impermissible geographic locations of devices with which the credential may be shared, etc. Conditions may also specify when access to a user credential is to be revoked.

A system in accordance with an implementation of the disclosed subject matter is shown in FIG. 1. Online service 101 is in communication with Users A-F through network 102. Users B, C and D have been designated to be in a Social Network Group X, 103. User A can designate a Wi-Fi password for User A's home network to share with members of Group X 103. In an implementation, Social Network Group X 103 can include friends of User A that have accepted User A's invitation to attend a party at User A's house on March 5 from 6:00 PM to 11:00 PM. The server can receive a signal indicating conditions for sharing the password. The conditions can include one or more identifiers that specify Users B-D. For example, the signal can include an identifier corresponding to members of Social Network Group X 103. The signal can also indicate a time range (e.g., 6:00 PM-11:00 PM), a date or date range (such as March 5) and a geographic location, such as the location of User A's house.

The Wi-Fi password to be shared can be stored (e.g., by routine backup) on cloud service server 101. The server can determine when any of the designated users are at or near User A's house between 6:00 PM and 11:00 PM on March 5. Based on this determination, the server can send the credential to mobile devices belonging to members of Social Network Group X 103 (Users B-D) between 6:00 PM and 11:00 PM on March 5 for those members of Social Group X 103 that are at or near User A's house within that time and on that date.

In an implementation, the sharing user may specify a temporal threshold for a time or time range. For example, if the time specified is 3:00 PM and the temporal threshold is 30 minutes, then the credential may be shared with an otherwise qualified other user within 30 minutes of 3:00 PM. In an implementation, a threshold of 30 minutes may be applied to a time range such as 6:00 PM-11:00 PM to enable sharing of the credential with any otherwise qualified other user from 5:30 PM-11:30 PM. An otherwise qualified other user is another user who meets the rest of the sharing conditions.

In an implementation, the sharing user may specify a geographical threshold. For example, if the sharing user specifies a geographical location of his home and a geographical threshold of 1000 meters, then an otherwise qualified other user may receive the credential when the other user is within 1000 meters of the home.

The shared credentials may or may not be visible on the mobile devices of Users B-D. In this way, a user with whom the credential has been shared cannot share it with another user who may not be authorized. After the credential has been shared, the mobile devices of Users B-D can logon to User A's home network.

At 11:00 PM, the server 101 can send a credential revocation message to the mobile devices of Users B-D, thereby causing the shared credential to be revoked. In an implementation, the shared password is deleted from the devices of Users B-D. In another implementation, the shared password is suspended but not deleted. In some implementations, a suspended password may be reinstated by the server if the shared-with user with the suspended credential meets sharing criteria later. After the credential has been shared, the mobile devices cannot logon to User A's home network using the credential shared at 6:00 PM. In another implementation, a revocation message can be generated when a user is deleted or otherwise departs from membership in a group that has been authorized to share the credential. For example, such a revocation request can be automatically generated and sent to the server from a social network that tracks membership of social network users in groups. A revocation message can be generated automatically when a shared-with user falls out of compliance with one or more sharing conditions.

In accordance with an implementation, a user may utilize a social network to designate a group of users with whom the credential is to be shared. For example, the user may designate a group of users on his social network that has been named "Family". He may designate a Wi-Fi credential to be shared with his Family group. Thus, if he changes the password on his home network router and enters it into his mobile device, the new password can stored on the server and be automatically shared with the other members of the Family group.

To facilitate the sharing of a credential with groups, a credential sharing interface can be provide to the sharing user that is integrated with, or a part of, the user's account on a social network. In an implementation, a user can logon to his account on a social network and select a group with whom to share a credential such as a Wi-Fi password. The user may also set conditions for sharing the password via an interface provided by the social network provider or via an interface provided by an application on the user's device itself. The social network can send a message to a server (either directly or through the user's device) that can include the identities and/or addresses of members of the selected group with whom to share the credential, as well as an identifier corresponding to the credential to be shared. The server can determine if the sharing conditions are met and, if so, cause the credential to be shared with members of the group. In another implementation, the conditions can be set using an application on the user's device, which can also determine when the conditions are met. When the conditions are met, the device can directly share the credential with one or more other users, or send a message to the server to cause the server to share the credential with authorized other users.

Whether integrated with a social network or not, the sharing interface can show a list of user credentials available for sharing and a list of users. The list of users can be sourced from the user's Contacts list, email senders and recipients, text messengers, phone callers and called parties and other sources of contacts information available to the mobile device. The user can select a credential for sharing and select which users or groups of users with whom the credential may be shared. Other elements of the interface can include a time and time range selector and a geographical location or geographical area selector. It can also include an interface for setting temporal and/or geographical thresholds.

It can also include an interface for specifying credential revocation conditions. For example, an implementation can include a data threshold. If a shared-with user downloads more data than the amount specified in the threshold, then the server can automatically generate a revocation message and cause the user to lose access to the gateway. Other examples of credential revocation conditions include identifying one or more websites or other online resources that, if accessed by a shared-with user, cause the generation of a revocation message to the shared-with user's device. In an implementation, a revocation message can also cause a user to be logged-off the resource that the shared-with user is accessing using the credential. In an implementation, this can be accomplished by sending an instruction to the resource to logoff the shared-with user. In another implementation, an instruction can be sent to the shared-with user's device that causes the device to logoff the resource.

Figure 2:
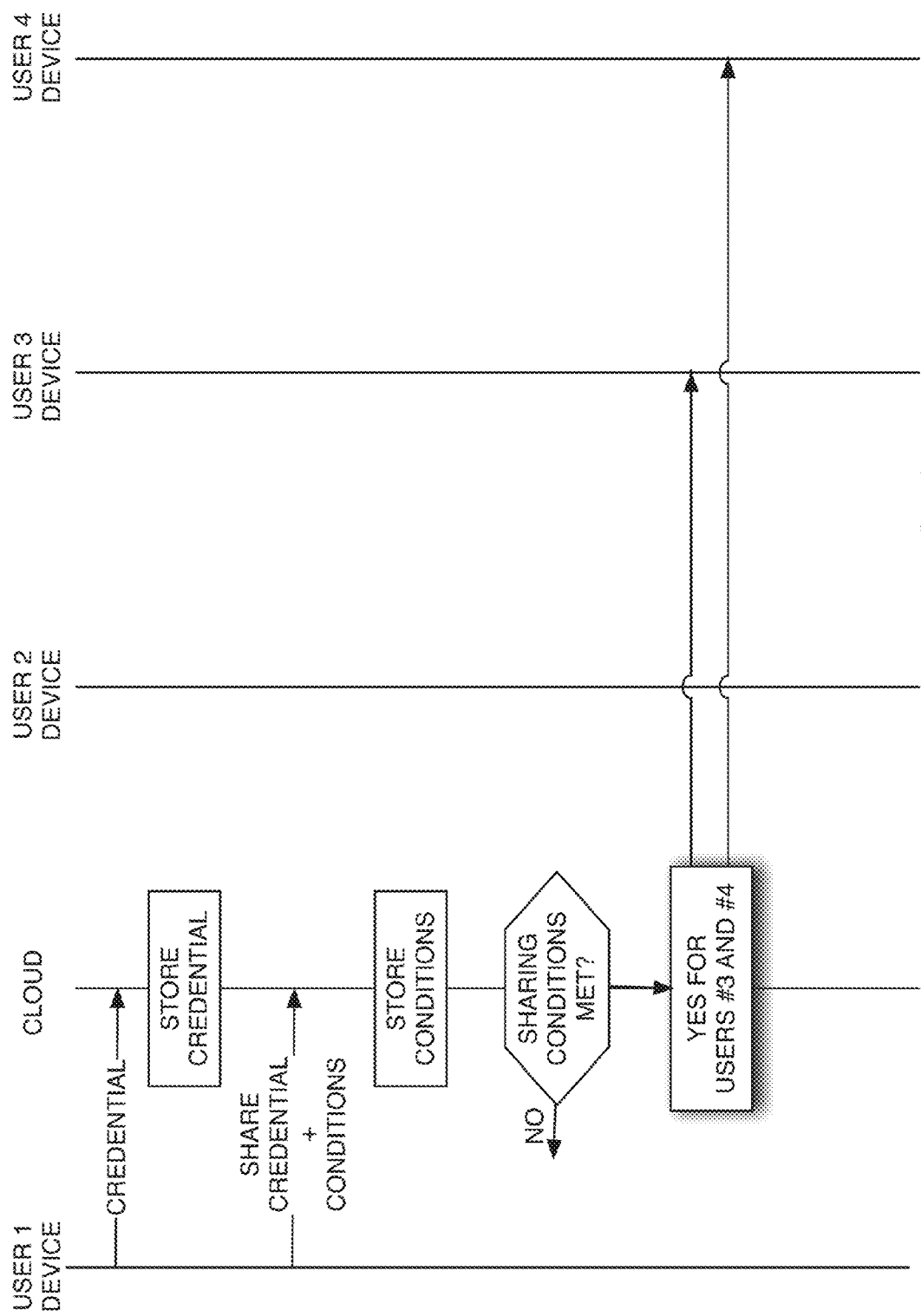
FIG. 2 shows a message flow according to an implementation of the disclosed subject matter.

FIG. 2 shows an example of a method in accordance with an implementation of the disclosed subject matter. A User 1 mobile device syncs with the user's account on a server. The sync can include sending a credential from the mobile device to the server for storage. The server can receive a signal from the User 1 device that indicates one or more conditions under which the credential is to be shared. The signal can include conditions such as the identity of other users or other user devices with whom the credential is to be shared. In this example, the signal indicates that the credential is to be shared with User 3 and User 4. The signal can also include any other condition or set of conditions that must be met for the credential to be shared as discussed above. For example, the signal can include instructions to the following effect:
(time is between 6:00 PM ET and 11:30 PM ET)
AND
(location is at 1150 Maple Ave 22209)
AND
(date is Mar. 18, 2016 OR Mar. 21, 2016)
These conditions can be stored at the server.

In an implementation, the server can determine that the conditions are satisfied and send the credential to the other users, such as User 3 and User 4 in FIG. 2. In an implementation, the credential is not sent to the other users until the conditions are met. For the example shown in FIG. 2, the credentials can be sent only on the specified date and within the specified time period, and only when the User 3's and 4's mobile devices are at or around 1150 Maple Ave.

Figure 3:
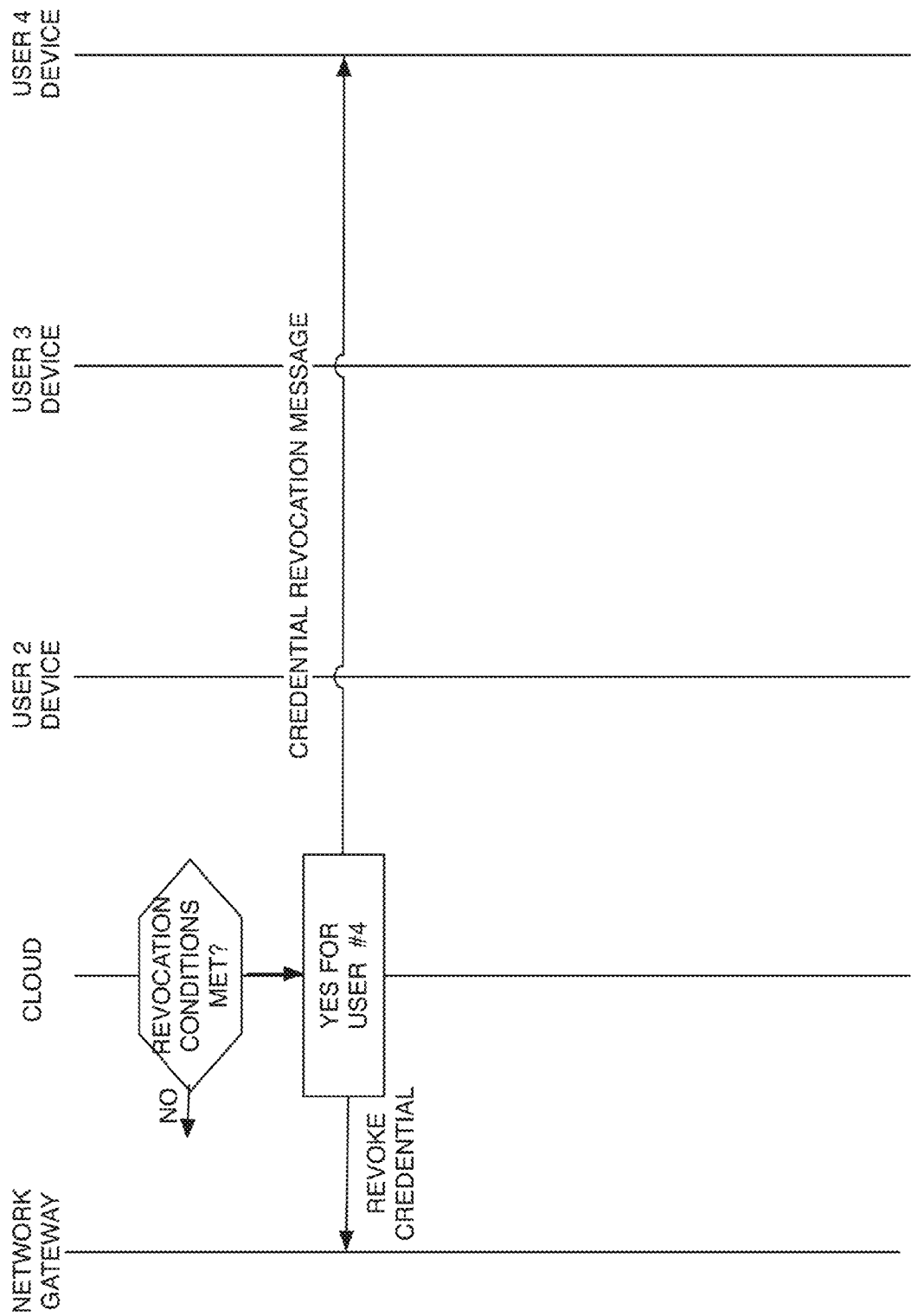
FIG. 3 shows another message flow according to an implementation of the disclosed subject matter.

FIG. 3 shows an example where revocation conditions have been met for User 4. The server can generate a revocation message and send it to the User 4 mobile device. The effect of the message can be to delete the credential on the User 4 mobile device, disable it or suspend it. A suspended credential cannot be used by the device to logon and may be restored in an implementation with a re-enablement message. Such a re-enablement message can be generated automatically if/when the revocation conditions are no longer true and the sharing conditions are true, or upon the request of the sharing user.

In an implementation, the server can send a revocation message to the verifier, shown as a network gateway in FIG. 3. In this case, the credential is revoked or suspended at the verifying entity. A verifying entity (also, a verifier) can include the entity that verifies a credential to determine if the presenter of the credential is entitled to use a resource. It can also include the resource itself. Thus, even if User 4 presents the shared credential to logon to the network gateway, the network gateway will deny access. The revocation message sent to the verifier may be in addition to or instead of the revocation message sent to the shared-with user device, such as User 4.

Figure 4:
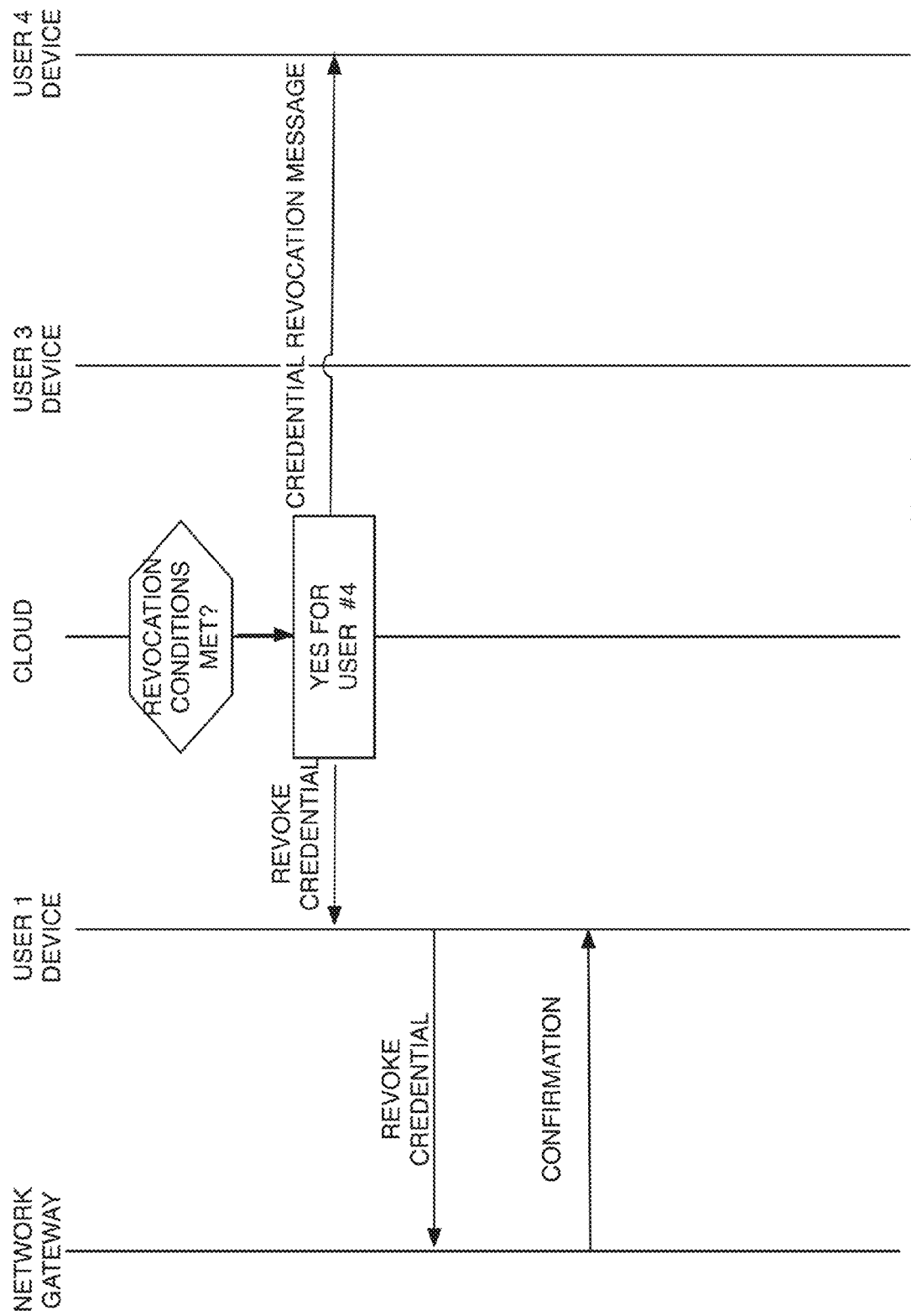
FIG. 4 shows another message flow according to an implementation of the disclosed subject matter.

FIG. 4 shows another implementation where the revocation message is automatically generated by the server and sent to the sharing user, which can send it on to the verifier, which in this case is the sharing user's cable modem. In another implementation, the server can send a message to the sharing user indicating that it will or has sent a revocation message to a shared-with user, such as User 4. In an implementation, the sharing user can override the revocation message and cancel it, e.g., by sending a reply to the server canceling the transmission of the revocation message. In other implementations, the revocation message can be sent to the shared-with user such as User 4 through the sharing user or through another third party.

The signal indicating at least one condition under which the password is to be shared can include one or more identifiers corresponding to another user with whom the password is to be shared, such as a shared-with user account name, a shared-with user username, a shared-with user alias, etc. The signal can include a type of other user with whom the password is to be shared. For example, the signal can indicate that shared-with users be members of a given list, organization or social network, have a mobile device with a given operating system, application or set of applications, are relatives of the sharing user, are employees or contractors of the sharing user, or any other user profile information.

Figure 5:
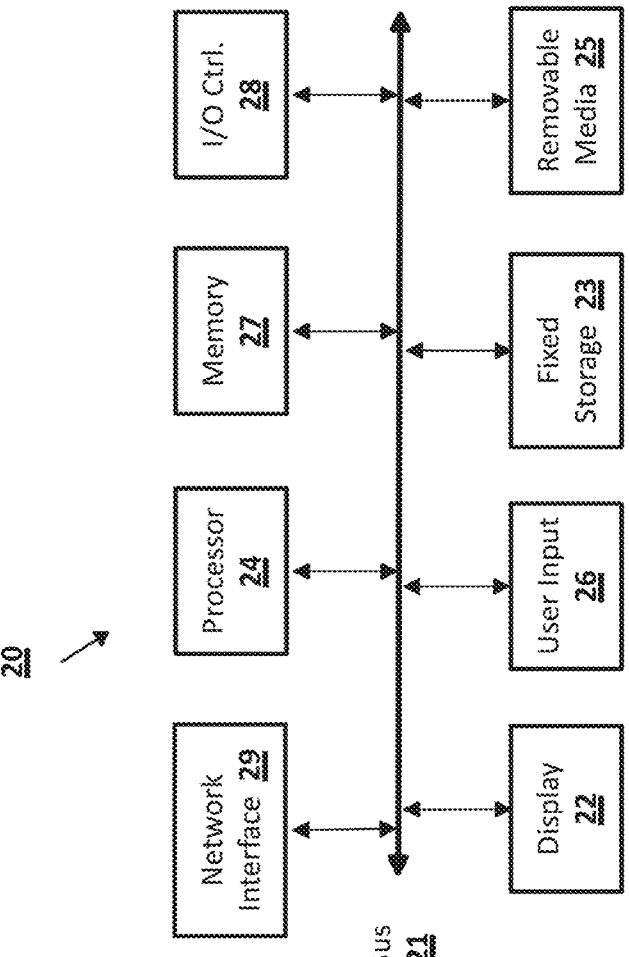
FIG. 5 shows a computer according to an implementation of the disclosed subject matter.

Implementations of the presently disclosed subject matter may be implemented in and used with a variety of component and network architectures. FIG. 5 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
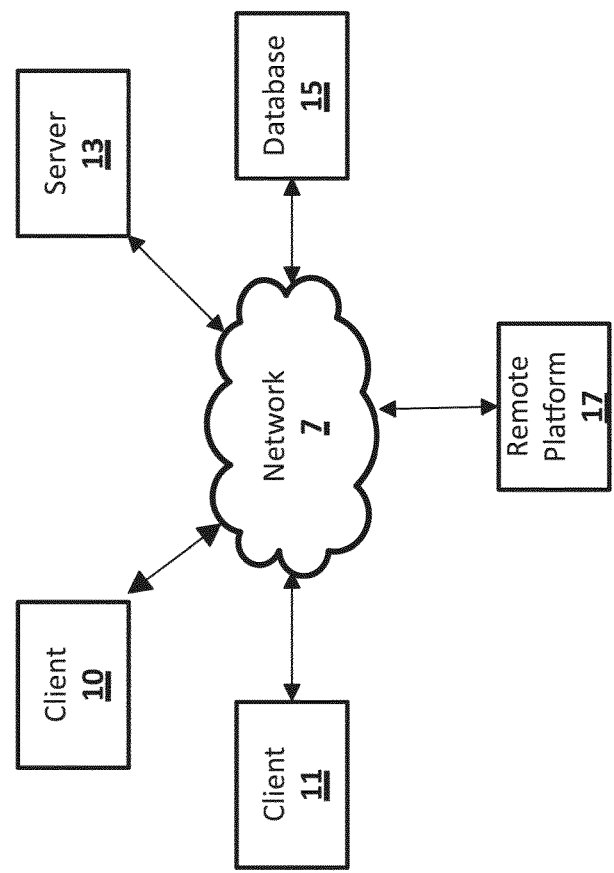
FIG. 6 shows a network configuration according to an implementation of the disclosed subject matter.

FIG. 6 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
receiving a password and a network access identifier from a device of a first user, the password allowing a device to logon to a network associated with the network access identifier;
receiving a signal indicating at least one condition under which the password is to be shared;
in response to the receiving a signal indicating at least one condition under which the password is to be shared, determining that at least one second user is authorized to have access to the password; and
based upon the determination, sharing the password with the at least one second user by storing the password and the network access identifier on a device of the at least one second user such that the device of the at least one second user can use the password to logon to the network associated with the network access identifier.

2. The method of claim 1, wherein the receiving a password and a network access identifier comprises syncing the device of the first user with an online account corresponding to the first user.

3. The method of claim 1, wherein the signal indicating at least one condition under which the password is to be shared comprises at least one from the group consisting of: an identifier corresponding to a second user with whom the password is to be shared, a type of a second user with whom the password is to be shared and an identifier of a group of a plurality of second users with whom the password is to be shared.

4. The method of claim 3, wherein the identifier of a group of a plurality of second users with whom the password is to be shared corresponds to a group on a social network.

5. The method of claim 3, wherein the identifier of a group of a plurality of second users with whom the password is to be shared corresponds to a group on a social network.

6. The method of claim 1, wherein the signal indicating at least one condition under which the password is to be shared comprises at least one from the group consisting of: a time, a date, a time range and a date range, a geographic location and a geographic area.

7. The method of claim 1, wherein the at least one condition under which the password is to be shared comprises at least one condition under which a shared password is to be revoked.

8. The method of claim 1, wherein the signal indicating at least one condition under which the password is to be shared comprises at least one from the group consisting of: a time, a date, a time range and a date range, a geographic location and a geographic area.

9. The method of claim 1, wherein the at least one condition under which the password is to be shared comprises at least one condition under which a shared password is to be revoked.

10. The method of claim 1, wherein the sharing the password with the at least one second user comprises sending a password sharing signal to the at least one device associated with the at least one second user.

11. The method of claim 1, wherein the sharing the password with the at least one second user comprises sending a password sharing signal to the at least one device associated with the at least one second user causing the shared password not to be visible on a display of the at least one device.

12. The method of claim 1, further comprising sending a password revocation signal to the at least one second user.

13. A method, comprising:
receiving a credential corresponding to a first user from a device of the first user, the password allowing a device to access one or more of an application, a network, a website, and an online service;
receiving a signal indicating at least one condition under which the credential is to be shared;
in response to the receiving a signal indicating at least one condition under which the credential is to be shared, determining that at least one second user is authorized to have access to the credential; and
based upon the determination, sharing the password with the at least one second user by storing the credential and the network access identifier on a device of the at least one second user such that the device of the at least one second user can use the credential to access the one or more of an application, a network, a website, and an online service.

14. The method of claim 13, wherein the signal indicating at least one condition under which the password is to be shared comprises at least one from the group consisting of: an identifier corresponding to a second user with whom the password is to be shared, a type of a second user with whom the password is to be shared and an identifier of a group of a plurality of second users with whom the password is to be shared.

15. The method of claim 14, wherein the identifier of a group of a plurality of second users with whom the password is to be shared corresponds to a group on a social network.

16. The method of claim 13, wherein the signal indicating at least one condition under which the password is to be shared comprises at least one from the group consisting of: a time, a date, a time range and a date range.

17. The method of claim 13, wherein the at least one condition under which the password is to be shared comprises at least one condition under which a shared password is to be revoked.

18. The method of claim 13, wherein the sharing the password with the at least one second user comprises sending a password sharing signal to the at least one device associated with the at least one second user causing the shared password not to be visible on a display of the at least one device.

19. The method of claim 18, wherein the sharing the password with the at least one second user comprises sending a password sharing signal to the at least one device associated with the at least one second user causing the shared password not to be visible on a display of the at least one device.

20. A system, comprising:
a server comprising a processor and a network interface,
the network interface configured to receive a credential corresponding to a first user from a device of the first user, the credential allowing a device to access one or more of an application, a network, a website, and an online service, and
receive a signal indicating at least one condition under which the credential is to be shared; and
the processor configured to:
in response to the received signal indicating at least one condition under which the credential is to be shared, determine that at least one second user is authorized to have access to the credential, and
based upon the determination, share the password with the at least one second user using the network interface by storing the password and the network access identifier on a device of the at least one second user such that the device of the at least one second user can use the password access the one or more of an application, a network, a website, and an online service.

* * * * *